United States Patent
Hayasaka (10) Patent No.: US 10,241,663 B2
(45) Date of Patent: Mar. 26, 2019

(54) INFORMATION PROCESSING APPARATUS CAPABLE OF BEING OPERATED BY MULTI-TOUCH

(71) Applicant: TEAC Corporation, Tokyo (JP)

(72) Inventor: Kaname Hayasaka, Saitama-ken (JP)

(73) Assignee: TEAC CORPORATION, Tokyo (JP)

( * ) Notice: Subject to any disclaimer, the term of this patent is extended or adjusted under 35 U.S.C. 154(b) by 848 days.

(21) Appl. No.: 14/607,972

(22) Filed: Jan. 28, 2015

(65) Prior Publication Data

US 2015/0212721 A1 Jul. 30, 2015

(30) Foreign Application Priority Data

Jan. 30, 2014 (JP) .................................. 2014-015863

(51) Int. Cl.
| | | |
|---|---|---|
| *G06F 3/048* | (2013.01) | |
| *G06F 15/16* | (2006.01) | |
| *G06F 3/0481* | (2013.01) | |
| *G06F 3/0484* | (2013.01) | |
| *G06F 3/0488* | (2013.01) | |

(52) U.S. Cl.
CPC ........ *G06F 3/04847* (2013.01); *G06F 3/0488* (2013.01); *G06F 2203/04808* (2013.01)

(58) Field of Classification Search
CPC ....... G06F 3/04883; G06F 2203/04808; G06F 3/0488; H04H 60/04
See application file for complete search history.

(56) References Cited

U.S. PATENT DOCUMENTS

| | | | |
|---|---|---|---|
| 2006/0031874 A1* | 2/2006 | Ok ...................... | G06F 3/04815 725/39 |
| 2007/0052687 A1 | 3/2007 | Terada | |
| 2009/0222276 A1* | 9/2009 | Romney ........... | G06F 17/30896 705/300 |
| 2010/0004030 A1 | 1/2010 | Nam | |
| 2010/0295802 A1* | 11/2010 | Lee ....................... | G06F 1/1626 345/173 |
| 2011/0035692 A1* | 2/2011 | Sandone .............. | G11B 27/034 715/769 |
| 2011/0058690 A1 | 3/2011 | Kuzuryu et al. | |
| 2011/0069025 A1* | 3/2011 | Fujita .................. | G06F 3/04847 345/173 |
| 2011/0130200 A1 | 6/2011 | Terada et al. | |
| 2011/0231796 A1* | 9/2011 | Vigil ................... | G06F 3/04883 715/810 |

(Continued)

FOREIGN PATENT DOCUMENTS

| | | |
|---|---|---|
| CN | 101246470 A | 8/2008 |
| CN | 103207918 A | 7/2013 |

(Continued)

*Primary Examiner* — Jordany Nunez
(74) *Attorney, Agent, or Firm* — Seed IP Law Group LLP (57) ABSTRACT

An information processing apparatus capable of easily adjusting parameter values of operation elements by multi-touch operation. Operation elements are displayed on a touch panel. A CPU detects a touch on a first operation element, like a first fader, as a first touch. When detecting a touch on a second element, like a second fader, as a second touch while the first touch is maintained, the CPU reflects a parameter value set on the first operation element onto a parameter value of the second operation element.

13 Claims, 5 Drawing Sheets

(56) References Cited

U.S. PATENT DOCUMENTS

| | | | |
|---|---|---|---|
| 2012/0054688 A1* | 3/2012 | Ohki | G06F 3/04883 |
| | | | 715/838 |
| 2012/0306778 A1 | 12/2012 | Weeldreyer et al. | |
| 2012/0319971 A1 | 12/2012 | Eguchi et al. | |
| 2013/0332823 A1 | 12/2013 | Liu | |
| 2013/0335335 A1* | 12/2013 | Neelakant | G06F 3/0486 |
| | | | 345/173 |
| 2014/0267078 A1* | 9/2014 | Kukulski | G06F 3/0416 |
| | | | 345/173 |

FOREIGN PATENT DOCUMENTS

| | | |
|---|---|---|
| CN | 103472972 A | 12/2013 |
| JP | 11-259124 A | 9/1999 |
| JP | 2007-072574 A | 3/2007 |
| JP | 2010-176568 A | 8/2010 |
| JP | 2010-244131 A | 10/2010 |
| JP | 2011-061548 A | 3/2011 |
| JP | 2011135562 A | 7/2011 |
| JP | 2012-098844 A | 5/2012 |
| JP | 2012-128258 A | 7/2012 |
| JP | 2013003918 A | 1/2013 |
| JP | 5232033 B2 | 7/2013 |
| JP | 5291590 B2 | 9/2013 |

* cited by examiner

INFORMATION PROCESSING APPARATUS CAPABLE OF BEING OPERATED BY MULTI-TOUCH

PRIORITY INFORMATION

This application claims priority to Japanese Patent Application No. 2014-015863, filed on Jan. 30, 2014, which is incorporated herein by reference in its entirety.

BACKGROUND OF THE INVENTION

Technical Field

The present invention relates to an information processing apparatus and, more particularly, to information processing performed by multi-touch operation.

Related Art

Technology for processing information by means of multi-touch operation has hitherto been proposed.

JP 5232033 B describes information selected by a first touch being pasted as it is to a position of a second touch when the second touch is detected while the first touch is still held.

JP 2011-135562 A describes the following. When new touch operation is detected while a parameter is selected by a first touch, the new touch operation is recognized as a second touch. Touch operation pertinent to parameters other than the parameter image being selected are made void, and a value of the parameter being selected is changed on the basis of a distance and direction of shift (rotating operation) of the second touch.

Incidentally, when various types of information processing apparatus are equipped with a plurality of operation elements, like control buttons and control knobs, there are a lot of cases where a control value of a certain operation element is desired to be adjusted to the same value as that of another operation element.

For example, in relation to a mixer fader capable of being operation by multi-touch, a parameter value of a channel (or a track) belonging to a certain fader A is sometimes desired to be set to the same parameter value as that of a channel (or a track) belonging to another fader B. In this case, all you need to do is to acquire the parameter value of the channel belonging to the fader B; to store the parameter value in memory; and to set the parameter value stored in the memory as a parameter value of the channel to which the fader A belongs. However, performing such copy and paste operation each time is troublesome. In particular, operability becomes worse with an increase in the number of faders to be set. In connection with JP 5232033 B, the information selected by the first touch is merely pasted as-is to the position of the second touch as mentioned above. Therefore, according to the technology, it is impossible to set the value of the fader to a desired value.

The above shows the case where the parameter of the fader is adjusted. In general; however, when a parameter of an arbitrary operation element is adjusted, a similar request or challenge may occur.

SUMMARY

The present invention provides an information processing apparatus that enables easy adjustment of a parameter value of an operation element through multi-touch operation.

An information processing apparatus of the present invention includes a touch panel for displaying at least a first operation element and a second operation element; and a processor reflects a parameter value set on the first operation element onto a parameter value of the second operation element when detecting a touch on the first operation element as a first touch and when detecting a touch on the second operation element as a second touch while the first touch is maintained.

In one embodiment of the present invention, the processor stores the parameter value set on the first operation element in memory when detecting the first touch, and the processor reads the parameter value stored in the memory when detecting the second touch, setting the thus-read parameter value to a parameter value of the second operation element.

In another embodiment of the present invention, the processor reflects the parameter value set on the first operation element onto the parameter value of the second operation element without modification or by increasing or decreasing the parameter value.

In still another embodiment of the present invention, the first operation element is a first fader; the second operation element is a second fader; and the processor reflects a level value set on the first fader onto a level value of the second fader.

In yet another embodiment of the present invention, the first operation element is a first equalizer; the second operation element is a second equalizer; and the processor reflects a parameter value set on the first equalizer onto a parameter value of the second equalizer.

In a furthermore embodiment of the present invention, the first operation element is a first text generated by a word processor; the second operation element is a second text generated by the word processor; and the word processor reflects an attribute set on the first text onto an attribute of the second text.

In a still further embodiment of the present invention, the first operation element is a first image generated by a drawing application; the second operation element is a second image generated by the drawing application; and the processor reflects an attribute set on the first image onto an attribute of the second image.

In a yet further embodiment of the present invention, the first operation element is a first character in an SNS or a computer game; the second operation element is a second character in the SNS or the computer game; and the processor reflects an attribute set on the first character onto an attribute of the second character.

The present invention makes it possible to easily adjust the parameter values of the operation elements by means of multi-touch operation.

The present invention will be more clearly comprehended by reference to the embodiment provided below. However, the embodiment provided below is illustrative, and the scope of the present invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention is hereunder described by reference to the drawings.

Figure 1:
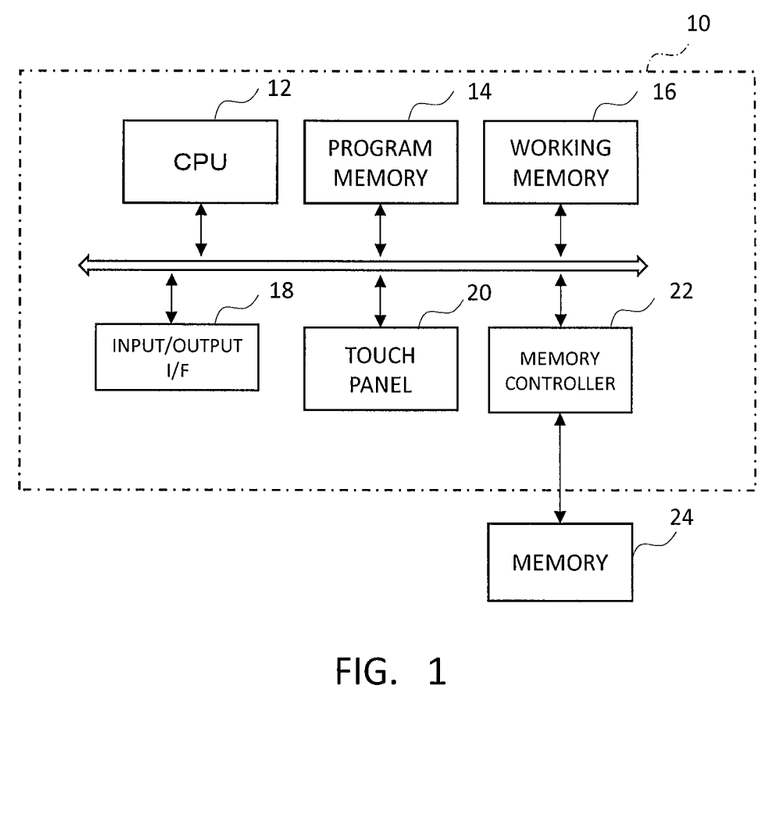
FIG. 1 is a block diagram of a configuration of an embodiment.

FIG. 1 shows a block diagram of a configuration of an information processing apparatus of the present embodiment. An information processing apparatus 10 is equipped with a CPU 12, program memory 14, working memory 16, an input/output interface I/F 18, a touch panel 20, and a memory controller 22.

The CPU 12 performs information processing involving multi-touch operation by use of the working memory 16 in accordance with a program stored in the program memory 14. Specifically, a user's touch given to a certain operation element (a first operation element) displayed on the touch panel 20 is detected as a first touch. A user's touch given to another operation element (a second operation element) displayed on the touch panel 20 while the first touch is maintained is detected as a second touch. In this case, the CPU 12 performs processing for reflecting a parameter value set for the first operation element onto a parameter value of the second operation element. The CPU 12 acquires a parameter value set on the operation element at the time of detection of the first touch; stores it in the working memory 16; reads the parameter value stored in the working memory 16 at the time of detection of the second touch; and sets the thus-read parameter value as the parameter value of the operation element at the detection of the second touch.

The input/output interface I/F 18 inputs and outputs various types of data.

The touch panel 20 detects a user's touch; supplies a detection signal to the CPU 12; and displays a variety of information in accordance with a command from the CPU 12. The variety of information includes a plurality of operation elements, such as buttons, switches, volume controls, level controls, and knobs.

The memory controller 22 stores various types of data into the memory 24 in accordance with the command from the CPU 12. In addition, the memory controller 22 reads the variety of data stored in the memory 24, supplying the thus-read data to the CPU 12. The memory 24 is of arbitrary type; for example, semiconductor memory and an optical disc. The memory 24 may also be incorporated as a hard disk, and the like, in the information processing apparatus 10.

In addition, aside from the CPU 12, the information processing apparatus 10 can also be equipped with a known graphic controller, VRAM, or the like, for displaying a variety of information on the touch panel 20.

In accordance with the command from the CPU 12, a plurality of operation elements are displayed on the touch panel 20. The user can select an operation element by touch operation and adjust a parameter of the thus-selected operation element. However, when a plurality of operation elements are present, a parameter of a certain operation element is desired to be set to the same value as that of a parameter of another operation element. The CPU 12 of the present embodiment realizes the desire by simple operation.

Explanations are hereinafter provided by taking a mixer fader as an example of the information processer.

The mixer fader is equipped with faders for adjusting respective levels of a plurality of channels (or tracks). The user increasingly or decreasingly adjusts a level of a specific channel by operating the faders. The touch panel 20 displays a fader image imitating the plurality of faders. The level of a channel to which a fader of interest belongs is increasingly or decreasingly adjusted by moving a knob (an operator) of the fader image through; for instance, vertical touch operation. At this time, the fader image corresponds to the operation element. The fader image can also be said to be a software-like fader as well as a physical fader.

Of the plurality of channels, two channels are taken as a channel "a" and a channel "b." A fader corresponding to the channel "a" is taken as a fader A (a first operation element), and a fader corresponding to the channel "b" is taken as a fader B (a second operation element). Assume that the user desires to adjust a parameter of the fader A, i.e., a level of the fader A, to a level La and subsequently adjust a parameter of the fader B, i.e., a level of the fader B, to the same level A as is the fader A. In this case, when the user selects the fader A by touching and also selects a copy (Copy) from a command menu on the touch panel 20 by touching, the CPU 12 temporarily stores the level La of the channel "a" corresponding to the fader A in the working memory 16. Next, the user selects the fader B by touching and also selects a paste (Paste) from the command menu on the touch panel 20, the CPU 12 reads the level La stored in the working memory 16 and sets the level La as the level of the channel "b" corresponding to the fader B, whereby the level of the channel "b" can be made identical with the level of the channel "a."

However, such operations; in other words,

<Operation I> a series of touching operations, such as touching the fader A→touching the copy menu→touching the fader B→touching the paste menu, are complicate. In particular, if an attempt is made to adjust other faders C, D, and E, as well as the fader B to the same parameter as that of the fader A, the number of operations increases correspondingly. Erroneous operation also becomes likely to occur accordingly. For instance, when the parameter value of the fader B and the parameter value of the fader C are adjusted, the following operations are required; namely, touching the fader A→touching the copy menu→touching the fader B→touching the paste menu→touching the fader C→touching the paste menu.

In the present embodiment; however, the CPU 12 readily sets the same value as the parameter value of the fader A on the other fader B (or still another fader) by detecting user's multi-touch operation.

Figure 2:
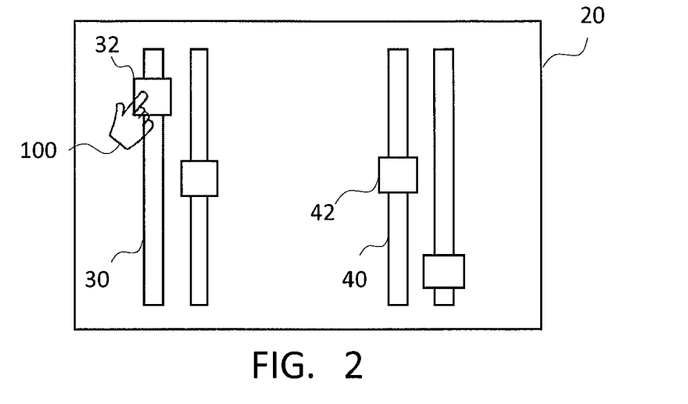
FIG. 2 is an explanatory view of operation of a mixer fader (Part 1)

FIG. 2 schematically illustrates the fader displayed on the touch panel 20. A plurality of faders, including a fader A30 corresponding to the channel "a" and a fader B40 corresponding to the channel "b," are displayed. A knob (operator) which the user can manipulate is displayed on each of the faders. A knob 32 is displayed on the fader A30, and a knob 42 is displayed on the fader B. The user selects the knob 32 by touching, thereby vertically moving the knob 32 to increase or decrease the level of the fader A while maintaining the touch of the knob 32. The same also applies to the knob 42.

When the user touches the knob 32 of the fader A30 with a finger 100 in such a state, the CPU 12 reads the level La of the channel "a" corresponding to the fader A in accordance with a detection signal from the touch panel 20, temporarily storing the level La in the working memory 16. Specifically, the CPU 12 does not require the user to perform operation pertinent to the copy menu and automatically, temporarily stores the level La of the channel "a" in the working memory 16.

Figure 3:
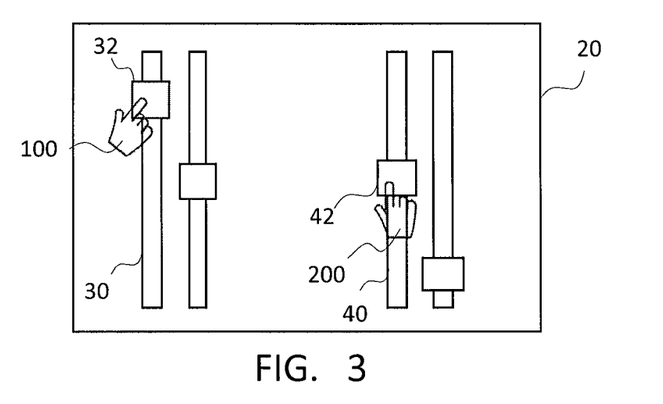
FIG. 3 is an explanatory view of operation of the mixer fader (Part 2)
Figure 4:
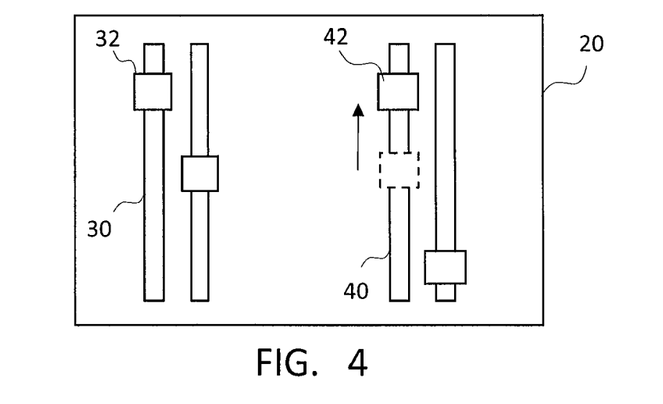
FIG. 4 is an explanatory view of operation of the mixer fader (Part 3)

Next, when the user touches the knob 42 of the fader B40 with a finger 200 while keeping the touch operation of the finger 100 as shown in FIG. 3, the CPU 12 detects simultaneous touches of the fingers 100 and 200, interpreting the multi-touch operation as operation for copying a parameter value of the channel "a" corresponding to the fader A to a parameter value of the channel "b" corresponding to the fader B and automatically setting the level La stored in the working member 16 to the level of the channel "b" corresponding to the fader B40. Further, as shown in FIG. 4, the CPU 12 automatically moves the knob 42 of the fader B40 to the same position where the knob 32 of the fader A30 is situated. When the information processing apparatus is equipped with a mechanical moving fader capable of following the motion of the fader displayed on the touch panel 20, a knob of a target moving fader (a moving fader corresponding to the fader B40 in the embodiment) can also be automatically moved according to a parameter setting made by multi-touch operation.

As above, parameter values are automatically controlled by detecting user's multi-touch operation. Thereby, the user can control the level of the channel "b" corresponding to the fader B to a desired value by simply, simultaneously touching the knob 32 of the fader A30 that is a control source and the knob 42 of the fader B40 that is a control target. In the embodiment, the operation that the user is required to perform is merely <Operation II> touching the fader A→touching the fader B while maintaining the touch of the fader A. Compared with the operation <I>, operation of the embodiment is obviously simple.

The only requirement to perform <Operation II> is to touch; for instance, the fader A with a left finger and the fader B with a right finger. However, "Operation II" is not limited to such touch operation. The user can also touch the fader A and the fader B with a plurality of right fingers or left fingers. Moreover, in the present embodiment, the knob 42 of the fader B40 is automatically moved as shown in FIG. 4 but can also be left stationary. Alternatively, the mixer fader can also be configured such that the user can set whether to move the knob 42. In addition, any marks or symbols that correlate the fader A30 with the fader B40 can also be displayed. For instance, the knob 32 of the fader A30 and the knob 42 of the fader B40 are displayed in the same color.

Figure 5:
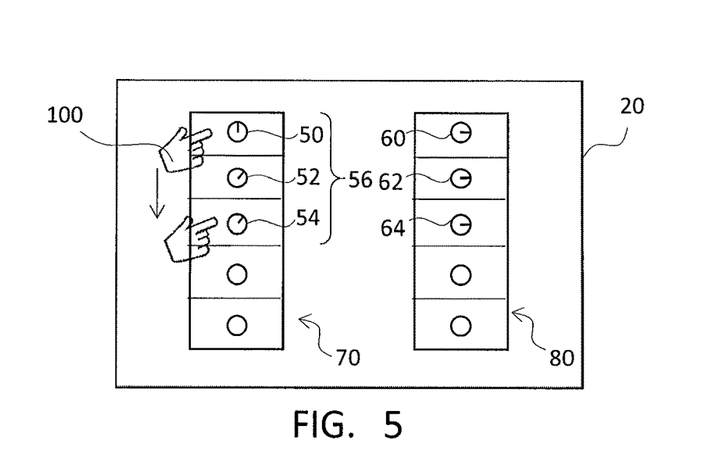
FIG. 5 is an explanatory view of operation of another mixer fader (Part 1)

FIG. 5 shows a diagram of another mixer fader to be displayed on the touch panel 20. Knobs 50, 52, and 54 of an equalizer 70 corresponding to the channel "a" are displayed, and knobs 60, 62, and 64 of an equalizer 80 corresponding to the channel "b" are displayed. The user can turn the knob 50 by touching, and controls a gain, and the like, through turning operation. The same also applies to the other knobs 52, 54, 60, 62, and 64.

When desiring to adjust the knob 60 to the same gain after adjusting the knob 50 by touching, the user performs operation in the same way as in FIG. 2. Namely, the user touches the knob 50 with the finger 100 and additionally touches the knob 60 while maintaining the touch. Thereby, the CPU 12 automatically stores a gain value; that is, a parameter value of the knob 50, in the working memory 16 in a temporary manner, setting the parameter value to the parameter value of the knob 60. Simultaneously, the CPU 12 automatically turns the knob 60 to the same rotational position where the knob 50 is situated.

In the meantime, in addition to the specific knob 60, the user may desire to adjust parameter values of the plurality of knobs 60, 62, and 64 to the same values as those of the knobs 50, 52, and 54, respectively.

Figure 6:
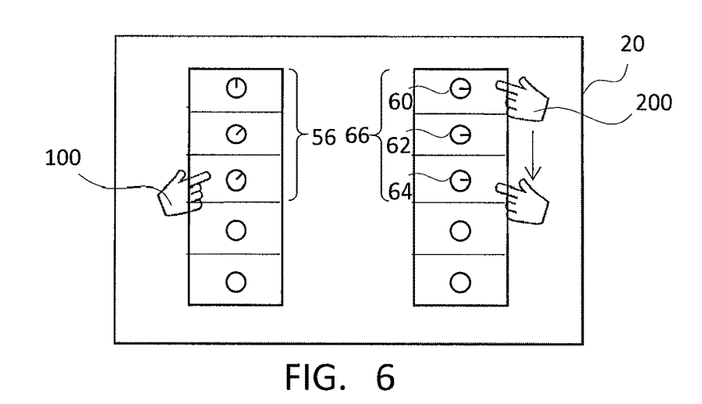
FIG. 6 is an explanatory view of operation of the other mixer fader (Part 2)
Figure 7:
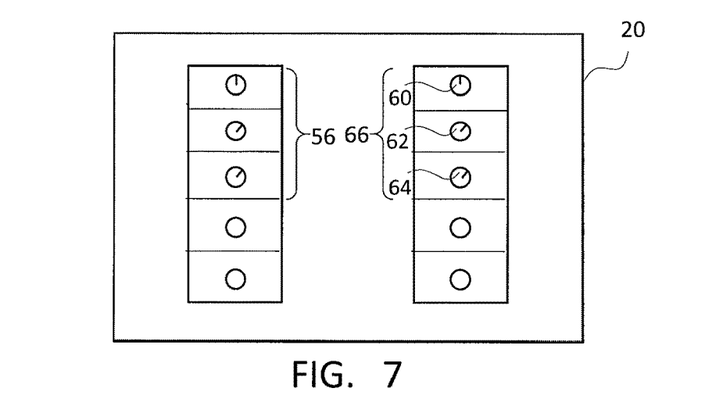
FIG. 7 is an explanatory view of operation of the other mixer fader (Part 3)

In this case, as shown in FIG. 5, the user selects a range 56 containing the knobs 50, 52, and 54 by moving the finger 100 so as to include the knobs 50, 52, and 54. Next, as shown in FIG. 6, the user selects a range 66 containing the knobs 60, 62, and 64 by moving the finger 200 so as to include the knobs 60, 62, and 64 while maintaining the touch of the finger 100. Upon detection of multi-touch operation, the CPU 12 reads parameter values of the knobs 50, 52, and 54 and temporarily stores the thus-read parameter values in the working memory 16, setting the values as respective parameter values of the knobs 60, 62, and 64. Specifically, provided that respective gain values of the knobs 50, 52, and 54 are G1, G2, and G3, the gain value of the knob 60 is set to G1; the gain value of the knob 62 is set to G2; and the gain value of the knob 64 is set to G3. Moreover, as shown in FIG. 7, the CPU 12 automatically turns the knobs 60, 62, and 64, bringing the knob 60 into agreement with the position of the knob 50, the knob 62 into agreement with the position of the knob 52, and the knob 64 into agreement with the position of the knob 54. Meanwhile, when the knobs of the equalizer 70 corresponding to the channel "a" and the knobs of the equalizer 80 corresponding to the channel "b" respectively make up an identical constituent group, a configuration can also be made in such a way that settings of the plurality of knobs of the equalizer 70 selected as a range by movement of the finer 100 are set on their counterpart knobs of the same attributes in the equalizer 80 by one-touch operation; namely, by touching an arbitrary position on the equalizer 80 with the finger 200. An example is as follows: when the knobs 50, 60 are previously assigned to level setting; the knobs 52, 62 are assigned to gain setting; and the knobs 54, 64 are assigned to frequency setting, the range 56 including the knobs 50, 52, and 54 is selected by moving the finger 100, and an arbitrary position on the equalizer 80 is touched with the finger 200, whereby a parameter of the knob 50, a parameter of the knob 52, and a parameter of the knob 54 are globally set to the knob 60, the knob 62, and the knob 64, respectively.

Through above processing, the user can simultaneously set parameter values of the plurality of knobs to respective desired values by means of only selecting the range 56 of control sources and also selecting a range of control targets by multi-touch operation.

Figure 8:
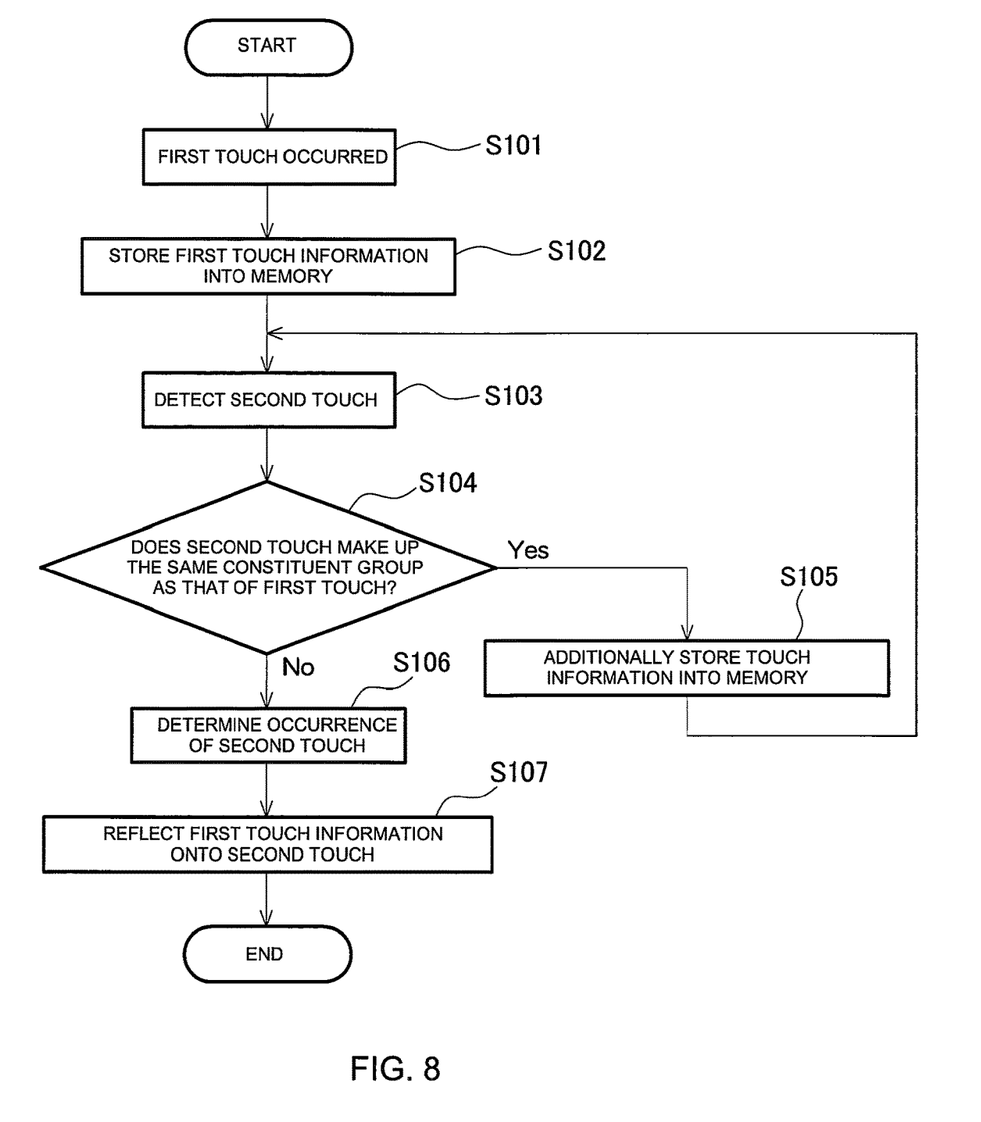
FIG. 8 is a processing flowchart of the embodiment.

FIG. 8 shows a processing flow chart of the present embodiment.

First, when the user gives a first touch on the touch panel 20 (S101), the CPU 12 detects the first touch, storing first touch information in the working memory 16 (S102). The first touch information referred to herein means a parameter value of an operation element selected by the first touch. The parameter of the operation element varies from one operation element to another. When the operation element is a fader, its parameter is a level. When the operation element is an equalizer, its parameter includes a gain (an amplification degree), a FREQUENCY (a frequency), Q (a bandwidth), etc. The parameter of the operation element can also be said to be an attribute of the operation element. Moreover, the parameter value of the operation element can also be said to be an operation set value of the operation element. Again value of the knob 50; for instance, is stored in the working memory 16 through this processing.

When the user gives a second touch while maintaining the first touch on the touch panel 20 after the first touch information is stored in the working memory 16 (S103), the CPU 12 detects the second touch, determining whether or not the second touch makes up the same constituent group as does the first touch (S104). The determination corresponds to processing for determining whether or not a plurality of operation elements are selected, such as that shown in FIG. 5. As shown in FIG. 5, when the second touch is given to one of the same constituent group (for instance, in the case shown in FIG. 5 where the first touch is on the knob 50 and where the second touch is on the knob 52 or 54), the CPU 12 considers the second touch as a part of the first touch rather than a true second touch, additionally storing information about the second touch in the working memory 16 (S105). A gain value of the knob 52; for example, is stored in the working memory 16 through this processing. Processing pertaining to S103 is again repeated, and the touch information is sequentially stored in the working memory 16 when the second touch is given to on one of the same constituent group to which the first touch is given. Thereby, the gains values of the knobs 50, 52, and 54; for instance, are stored in the working memory 16.

In the meantime, when NO is selected in S104; namely, when the second touch does not make up the same constituent group as does the first touch (in an illustrated example; for instance, a case where the second touch is given to the 60, 62, or 64), the CPU 12 determines occurrence of the second touch (S106) and reflects the first touch information onto the second touch (S107). The CPU 12 reads the first touch information stored in the working memory 16, setting the information on the parameter value of the operation element of the second touch. Thereby, the gain value of the knob 50 is stored in the working memory 16 and set on the gain value of the knob 60 when the knob 50 is touched as the first touch and when the knob 60 is touched as the second touch. When the knobs 50 and 52 are touched as the first touch and when the knobs 60 and 62 are touched as the second touch, the gain values of the knobs 50 and 52 are sequentially stored in the working memory 16 and set on the respective gain values of the knobs 60 and 62. When the knobs of the equalizer 70 and the knobs of the equalizer 80 make up the same constituent group, a second touch can be recognized, as mentioned previously by giving a touch to an arbitrary position on the equalizer 80, whereby respective parameter values may be globally reflected on the respective knobs.

Incidentally, the number of operation elements selected by the first touch and the number of operation elements selected by the second touch may not necessarily be identical. For example, when the knob 50 is selected by the first touch and when the knobs 60 and 62 are selected by the second touch, the only requirement for the CPU 12 to do is to set the gain value of the knob 50 as gain values of the knobs 60 and 62.

Moreover, although a determination is made in S104 as to whether the first touch and the second touch make up the same constituent group, a determination may also be made as to whether or not the second touch is the continuation of the first touch; namely, whether or not a range is designated by the first touch. When the touch does not fall within the designated range, the touch can be determined as occurrence of a second.

Furthermore, the second touch is detected with the first touch being maintained in S103. However, when a touch is detected separately from the first touch, the CPU 12 does not detect the touch (the second touch) as a second touch. The second touch referred to in the present embodiment means a second touch making up a multi-touch. When a touch other than the first touch is detected and when a third touch is further detected while the other touch is maintained, the CPU 12 stores touch information about the other touch in memory, reflecting the information on the third touch.

Although the present embodiment of the present invention has been described by exemplifying the mixer fader, the present invention is not limited to the embodiment and can also be applied to other information processing.

Figure 9:
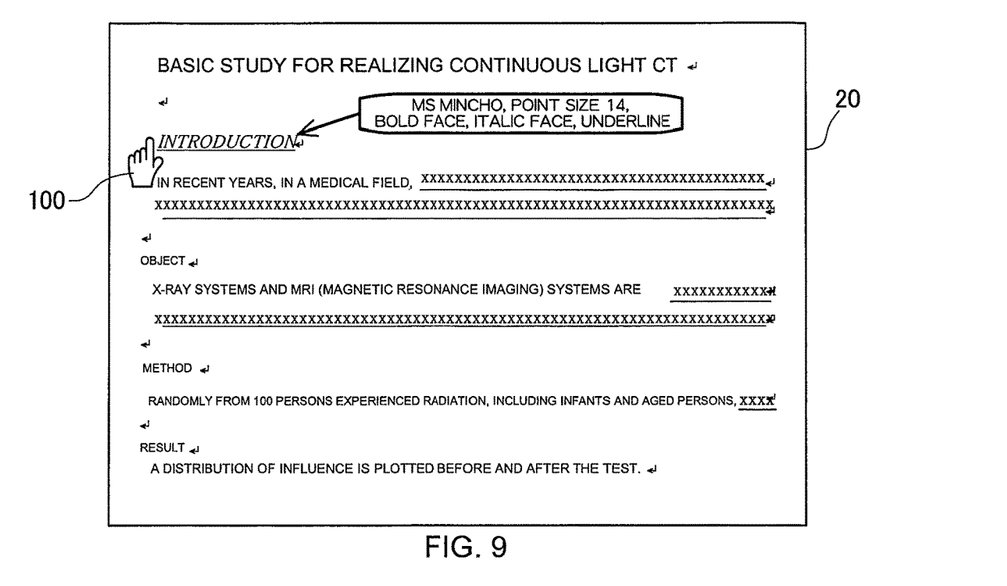
FIG. 9 is an explanatory view of operation of a word processor (Part 1)
Figure 10:
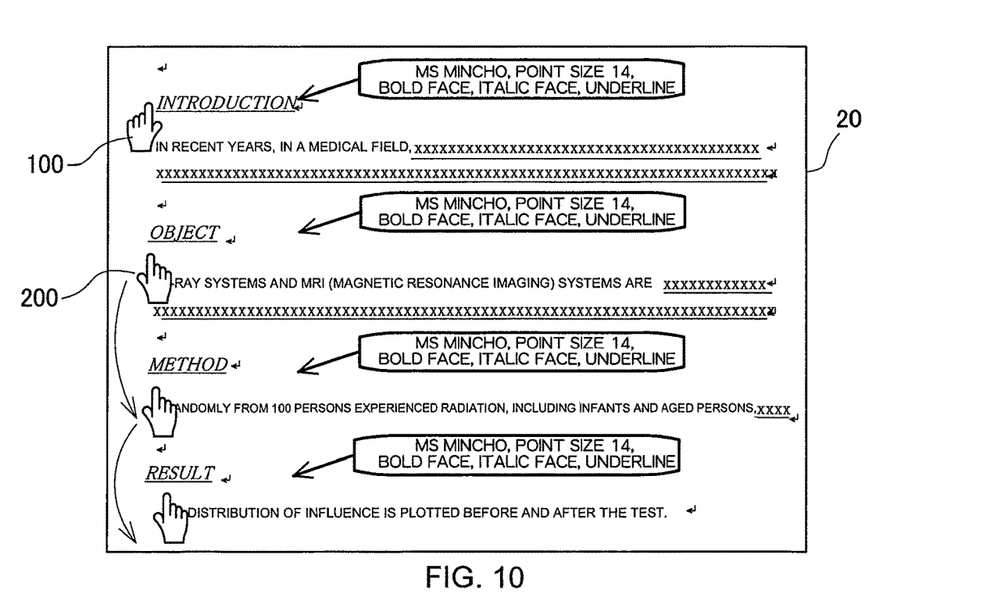
FIG. 10 is an explanatory view of operation of the word processor (Part 2).

FIGS. 9 and 10 show a case where the present invention is applied to a word processor.

In FIG. 9, arbitrary texts generated by a word processor are displayed on the touch panel 20. A specific format; specifically, decorations like a font, a character size, an appearance of the character, and an underline, is set on each of the texts. Assume that an "Introduction" in a text has settings; namely, "MS Mincho, a point size of 14, a bold face, Italic, and an underline." When the user desires to set the same font, etc., on the other texts, the user first gives a touch to "introduction" with the finger 100.

Next, as shown in FIG. 10, a touch is given, with the finger 200, to a location of the text that is desired to be set to the same setting as that of the text touched with the finger 100. The CPU 12 detects the touch given with the finger 100 as a first touch and the touch given with the finger 200 as a second touch. The CPU 12 also stores parameters or attributes set on the "Introduction"; namely, "MS Mincho, a point size of 14, a bold face, Italic, and an underline," in the working memory 16, setting the parameters or attributes as parameters or attributes of the text situated at the position selected by the second touch. Thereby, "Object," "Method," and "Result" are all standardized in the same format as that of the "Introduction." Although the information about the first touch given with the finer 100; namely, the "Introduction," is only pasted as-is to the position of the second touch given with the finger 200 according to Patent Document 1 in the related art. In the present embodiment; however, attention must be paid to the fact that the parameter values of the "Introduction" are stored in the working memory 16 by means of the first touch and that the parameter values are reflected as parameter values of the "Object" located at the position to the second touch.

Moreover, the present invention can also be applied to a social networking service (SNS) for computers, etc. For example, when a list of persons connected with the user is displayed on the touch panel 20 and when a disclosure/nondisclosure parameter is set on each of a plurality of items, a first touch is put on an item of a certain person, and a parameter is set by putting a second touch on an item of another person.

Moreover, the present invention can also be applied to paint-based computer applications. For example, a picture is drawn by automatically setting parameters pertinent to an area of the second touch in accordance with information about tools (pencils, watercolor paintings, oil paintings, crayons, airbrushing, etc.) and information about colors (brightness, saturation, hues) pertaining to a location of the first touch on an image generated by the application. A plurality of operations have hitherto been performed by use of a mouse, a touch pen, and the like. However, according to the present invention, drawing can be readily realized by means of multi-touch operation.

The present invention can also be applied to computer games. For example, specific attributes are previously set on a specific character appearing in a game, and the same attributes are also set up on another characters. The user can easily add a desired attribute to a plurality of characters only by giving a first touch to a specific character and a second touch to other characters.

In the present embodiment, the parameter value set on an operation element is stored in the working memory 16 by giving a first touch to the operation element. Further, a second touch is given to another operation element while the first touch is maintained, whereby the parameter value is reflected on a parameter value of the other operation element. However, when reflection is performed, the same parameter value is reflected. However, in addition to reflecting the same parameter value, a parameter value can also be reflected after being increased or decreased by a setting. For example, a parameter value acquired by the first touch is reflected on a parameter of the second touch after being increased or decreased by 10%. In the case of a mixer fader, a level of a fader given a second touch is decreased by 10% or the like. The user can set a level of increase or decrease in advance. The number of parameter items can also be increased or decreased instead of a numerical value of a parameter being increased or decreased. For example, in the case of a word processor, only the font is reflected. The user can also previously set which item to be reflected.

In the present embodiment, the CPU 12 detects the first touch and the second touch. However, in order to distinguish the first touch from the second touch, it is also possible to identify whether the touch is given with a left finger or a right finger. For example, when a touch is given with the left finger, the touch is detected as a first touch. Meanwhile, when a touch is given with the right finger, the touch is detected as a second touch. In reality, it is difficult to distinguish the touch given with the left finger from the touch given with the right finger. However, when it is possible to detect that a second touch detection position is a location that cannot be touched only with a finger of one hand from a first touch detection position, it is possible to distinguish the left finger and the right finger. Alternatively, it is also possible whether or not a touch is given with a different finger. For instance, when a touch is given with an index finer, the touch is detected as a first touch. Further, when a touch is given with the first finger, the touch is detected as a second touch. In this case; however, it is possible to distinguish a touch of pinch-in and pinch-out operation (operation for enlarging or reducing a screen by touching a touch panel with two fingers) from the first and second touches, by detecting a time difference between detection of the first touch and detection of the second touch. Distinction can also be performed by combination with voice recognition. When a touch is given with a certain finger and when a voice of "Copy" is recognized, the touch is detected as a first touch. In addition, a touch is given with another finger and when a voice of "Reflection" is recognized, the touch is detected as a second touch. As a matter of course, voices "Copy" and "Reflection" are mere illustrations, and arbitrary voices can be combined together.

What is claimed is:

1. An information processing apparatus comprising:
   a touch panel which, in operation, displays at least a first constituent group including a plurality of operation elements and a second constituent group including a plurality of operation elements; and
   a processor which, in operation:
   detects a touch on a first operation element included in the first constituent group or the second constituent group,
   detects a touch on a second operation element included in the first constituent group or the second constituent group,
   determines whether the first operation element and the second operation element are included in a same constituent group, and
   in a case where the first operation element and the second operation element are not determined to be included in the same constituent group, reflects a parameter value set on the first operation element onto a parameter value of the second operation element when detecting the touch on the first operation element as a first touch and when detecting the touch on the second operation element as a second touch while the first touch is maintained,
   wherein, in a case where the first operation element and the second operation element are determined to be included in the same constituent group, the processor does not reflect the parameter value set on the first operation element onto the parameter value of the second operation element and does not detect the touch on the second operation element as the second touch.

2. The information processing apparatus according to claim 1, wherein the processor stores the parameter value set on the first operation element in memory when detecting the first touch, and the processor reads the parameter value stored in the memory when detecting the second touch, setting the thus-read parameter value to a parameter value of the second operation element.

3. The information processing apparatus according to claim 1, wherein the processor reflects the parameter value set on the first operation element, without modification, onto the parameter value of the second operation element.

4. The information processing apparatus according to claim 1, wherein the processor increases or decreases the parameter value set on the first operation element, reflecting the parameter value onto the parameter value of the second operation element.

5. The information processing apparatus according to claim 1, wherein the first operation element is a first fader; the second operation element is a second fader; and the processor reflects a level value set on the first fader onto a level value of the second fader.

6. The information processing apparatus according to claim 5, wherein each of the first fader and the second fader has a rectilinearly-movable knob, and the processor automatically moves the knob of the second fader to a position of the knob of the first fader when reflecting the level value set on the first fader onto the level value of the second fader.

7. The information processing apparatus according to claim 1, wherein the first operation element is a first equalizer; the second operation element is a second equalizer; and the processor reflects a parameter value set on the first equalizer onto a parameter value of the second equalizer.

8. The information processing apparatus according to claim 7, wherein the parameter value is at least any of a gain, a frequency, and a bandwidth.

9. The information processing apparatus according to claim 7, wherein each of the first equalizer and the second equalizer has a turnable knob, and the processor automatically turns the knob of the second equalizer to a position of the knob of the first equalizer when reflecting the parameter value set on the first equalizer onto the parameter value of the second equalizer.

10. The information processing apparatus according to claim 1, wherein, in the case where the first operation element and the second operation element are determined to be included in the same constituent group, the processor stores the parameter value set on the second operation element in memory.

11. The information processing apparatus according to claim 1, wherein the first operation element is a first text generated by a word processor; the second operation element is a second text generated by the word processor; and the word processor reflects an attribute set on the first text onto an attribute of the second text.

12. The information processing apparatus according to claim 1, wherein the first operation element is a first image generated by a drawing application; the second operation element is a second image generated by the drawing application; and the processor reflects an attribute set on the first image onto an attribute of the second image.

13. The information processing apparatus according to claim 1, wherein the first operation element is a first character in social networking service (SNS) or a computer game; the second operation element is a second character in the SNS or the computer game; and the processor reflects an attribute set on the first character onto an attribute of the second character.

* * * * *